May 7, 1940.                J. W. HALE                2,199,993
                        CHANGE SPEED SYSTEM
              Original Filed March 4, 1936      3 Sheets-Sheet 1
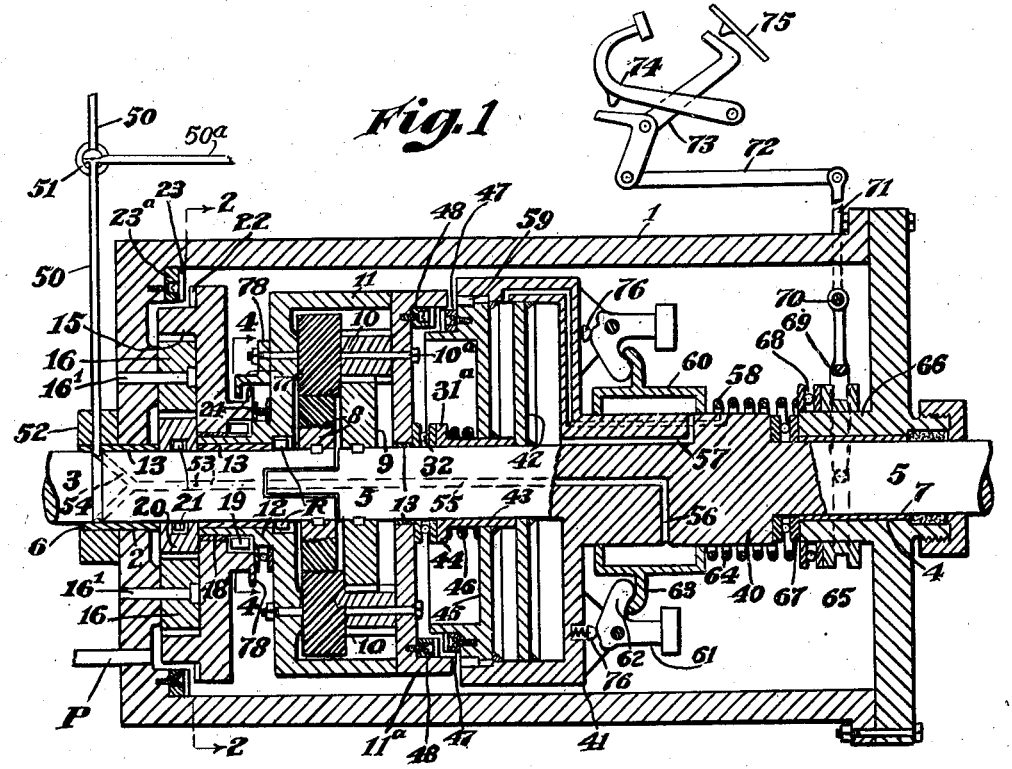
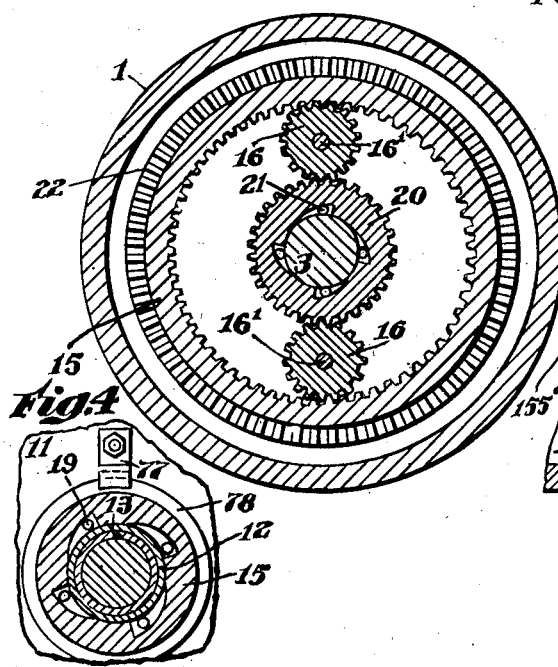
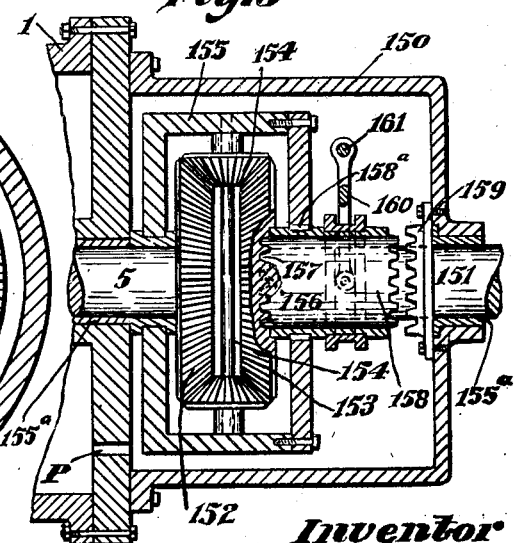
Inventor
Jesse W. Hale
By Attorney May 7, 1940.  J. W. HALE  2,199,993
CHANGE SPEED SYSTEM
Original Filed March 4, 1936  3 Sheets-Sheet 2
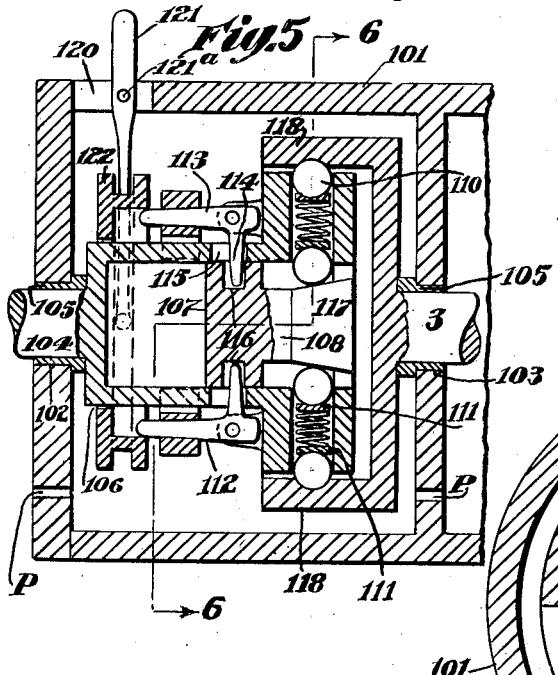
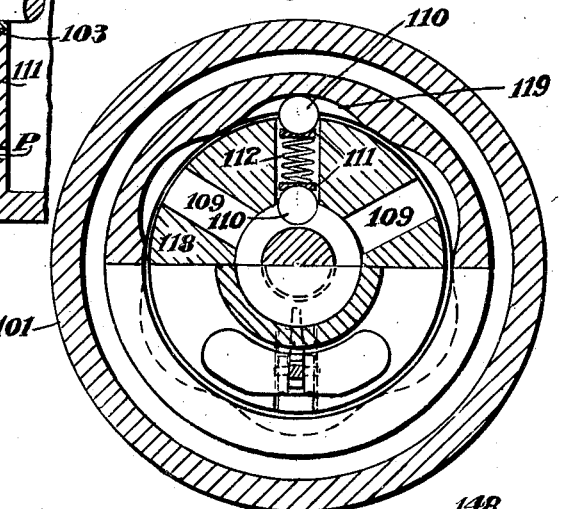
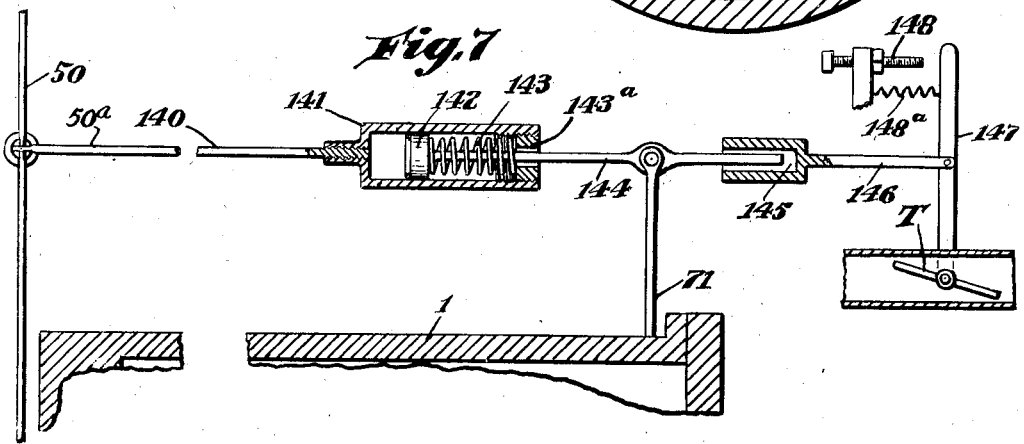
*Inventor*
*Jesse W. Hale*
By *Attorney*

May 7, 1940.   J. W. HALE   2,199,993
CHANGE SPEED SYSTEM
Original Filed March 4, 1936   3 Sheets-Sheet 3
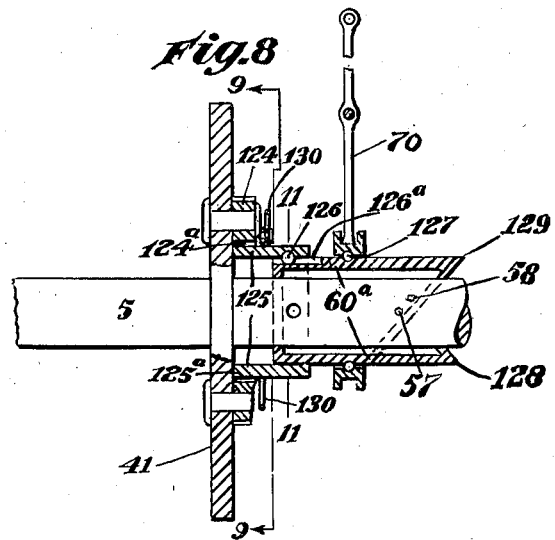
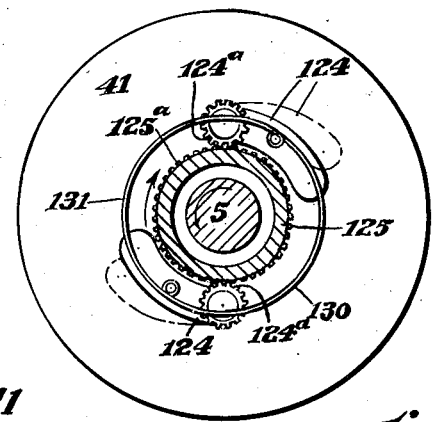
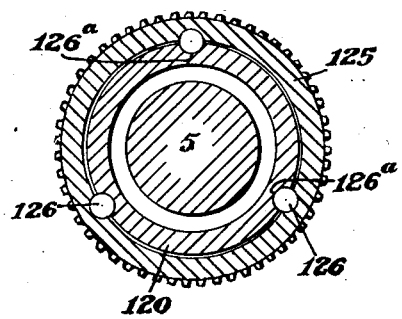
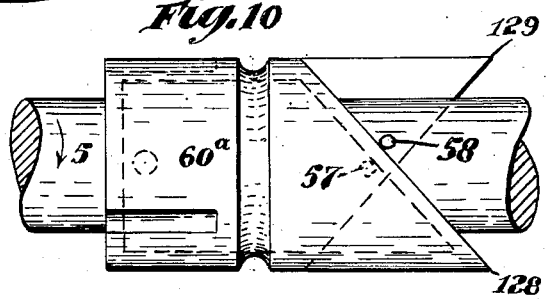
Inventor
Jesse W. Hale
By Ellis Spear
Attorney Patented May 7, 1940

2,199,993

UNITED STATES PATENT OFFICE 2,199,993

CHANGE SPEED SYSTEM

Jesse W. Hale, Newton Center, Mass.

Refiled for abondoned application Serial No. 66,995, March 4, 1936. This application July 19, 1937, Serial No. 154,426

19 Claims. (Cl. 74—260)

This application is a refile of abandoned application Serial No. 66,995, filed March 4, 1936.

My present invention relates to improvements in change speed systems utilizing the shaft converting means disclosed in my copending application, Serial No. 731,089, filed June 18, 1934.

While the use of such a device in automobiles affords the best illustration of its adaptability there are many other instances when the ratio between the driving and driven shafts can be automatically controlled with substantial advantage beyond the resulting convenience.

In my present invention I have utilized fluid pressure as the operating medium and have included novel modifications in the unit and in the system which relate both to effectiveness of operation and to different uses to which my invention is well adapted.

In the drawings I have shown illustrative embodiments of my invention and throughout the drawings and specification the reference numerals indicate corresponding parts.

In the drawings—

Fig. 1 is partly section view of my device.

Fig. 2 is section along the lines 2—2 of Fig. 1.

Fig. 3 illustrates a reversing unit.

Fig. 4 is a section along the lines 4—4 of Fig. 1.

Fig. 5 shows a novel main clutch.

Fig. 6 is a section along the lines 6—6 of Fig. 5.

Fig. 7 illustrates a modified control for the change speed unit.

Fig. 8 is a partly sectioned side view of a modified control for the fluid pressure.

Fig. 9 is a view of Fig. 8 along the lines 9—9 of Fig. 8.

Fig. 10 is a fragmentary view of the shaft and valve, and

Fig. 11 is a view along the lines 11—11 of Fig. 8.

A gear transmission system such as is indicated in the accompanying drawings may be provided with a housing 1 having an axial port 2 at one end for the drive shaft 3, and a second axial port 4 at the other end for driven shaft 5. Suitable bushings are indicated at 6 and 7.

Fixed on the drive shaft 3 is a gear 8 and similarly fixed to the driven shaft 5 is a gear 9, both in mesh with a differential step gear 10 rotatably mounted on the shaft 10a in the gear casing 11, which shaft may be considered as an assembly bolt for the casing parts. The gear casing 11 is slidably mounted for rotation independently of the drive shaft 3 and the driven shaft 5. The gear casing 11 is provided with an annular hub 12 and a rearwardly disposed annular flange 11a. Bushings are indicated at 13 for the hub 12 and the casing 11.

Within the hub 12 is a clutch member shown as of conventional roller type R, as suggested in Figs. 2 and 4. As long as the casing 11 is rotated oppositely to the drive shaft 3 or at the same or lesser speed, the rollers R will travel with the casing hub 12 freely over the shaft 3, but if the casing 11 tends to reverse its direction of travel, or its speed of rotation tends to become faster than that of the shaft 3, the clutch R acts to prevent such motion or reduces the speed of the casing 11 to the speed of the shaft. The part played by this clutch R, as well as the one-way clutches 19 and 21, later to be described, will be more fully set forth in connection with the description of phases of the operation of my change speed transmission system.

An internal rim gear member 15 meshes with idler pinion gears 16 mounted on studs 16¹ on the casing 1, and includes an annular hub rotating on an indicating bushing 18 on the hub 12 of the casing 11. The hub 17 encloses a second one-way clutch 19 (see Fig. 4) of the same general construction as the first clutch 14, which is provided to lock the casing 11 through the hub 12 to the annular hub 17 of the gear 14 as long as the casing 11 is rotated in a direction opposite to that of the shaft 13.

The idler pinion gears 16 which are rotated by the rim gear 15 mesh with a gear 20 which is free on the shaft 3, and serve to rotate the gear 20, when in operation, in the same direction as the drive shaft 3. The gear 20 is provided with an indicated one-way clutch 21 which locks the gear 20 on the shaft 3 when its speed of rotation tends to be greater than that of the shaft 3.

The locking of the gear 20 by the clutch 21 limits the reverse direction trend of the idler assembly, gear casing 11, and step gear 10 depending upon relative ratio. The ratio of gears 15 and 20 may be assumed to be, for example, on a one to four ratio. Assuming that the ratio between the gears 8, 9 and 10 be, for example, two to one, and the connected parts be stationary, the speed of the driven shaft 5 would be one-half the speed of the drive shaft 3. But with the assembly, the gear casing 11 and the step gear 10 are now rotating reversely and the ultimate speed of the driven shaft 5 will be controlled by the gear 20 which cannot rotate faster than the drive shaft 3. In other words, the ratio between the casing 11 and the gear 20 is one to four when the casing 11 is rotating reversely to the drive shaft 3, but as, however, the gear 20 cannot rotate faster than the drive shaft 3, the reverse rotation of the casing 11 is limited and the driven shaft is rotated at a four to one ratio providing a slow forward drive suitable for first speed.

The rim gear member 15 carries on its outer surface an annular "spline" type clutch 22 adapted to engage with a similar clutch member 23 mounted in shoulder blocks 23a on the casing 1. The annular hub 17 on the gear 15 and the casing 11 are spaced by thrust bearings indicated at 24.

While any type of clutch may be used, my invention is illustrated with the type of clutch shown in Figs. 1 and 2 so that any question of clutch slipping may be ignored and at the same time (as will appear later from other aspects of my invention), with a cushioned engagement.

The gear member 15 may be moved longitudinally of the shaft 3 with the gear casing 11 and thereby effect an interlock of the splines 22 and 23, whereupon the casing 11 will be held stationary to establish a two to one ratio, potentially in the gear system providing a suitable second speed. With this connection, the indicated one-way clutch 21 which held the gear 20 to the shaft 3 is released, permitting free rotation of the drive shaft 3 within the gear 20.

The driven shaft 5 is formed, preferably, with an enlargement 40 which carries a cylinder member 41 disposed with its open end towards the casing 11. Within the cylinder member 41 is a piston 42 which includes a hub 43 having an upturned end 44 between which and the upturned end of a bushing 13 for the casing 11 are positioned bearings indicated as at 32. Slidably mounted on the hub 43 is a second piston 45 under the influence of a spring 46 backed by the upturned end 44 of the hub 43. The piston 45 carries clutch members 47 adapted to engage like members 48 on the rear of the casing 11. These clutches are similar in construction to the clutches 22 and 23 before described.

From any pressure source such as the crank case (not shown) a conduit 50 controlled by a valve 51 leads into a hub 52 surrounding the shaft 3 while a conduit 50ª permits the circulation of the fluid when the valve 51 closes the flow of fluid to the hub 52. The shaft 3 is grooved within the hub 52 to define a fluid receiving conduit and is connected to the axial bore 53 as by a Y connection 54. The driven shaft 5 has a similar axial bore 55 which in the enlargement 40 is provided with a radial discharge 56. While I may deliver fluid in a similar manner directly to the driven shaft 5, I prefer to deliver it in the manner described to provide a positive lubrication. Rearwardly of the discharge 56 I provide a conduit 57 through the shaft portion 40 disposed to discharge through the cylinder 41 against the piston 42. Spaced rearwardly from the conduit 57 is a second conduit 58 passing through the cylinder 41 as shown clearly in Fig. 1 to discharge within the cylinder 41 and to actuate the piston 45 which is splined in the cylinder 41 as is indicated at 59. Slidably mounted on the enlarged portion 40 of the driven shaft 5 is a valve 60 having an annular recess of sufficient length to permit the port 56 to be connected to both the conduit 57 and to the conduit 58 successively. The cylinder 41 carries a governor 61 one arm 62 of which is adapted to bear against a forwardly curved flange 63 on the valve 60. A consideration of Fig. 1 will indicate the operation of the governor. When the governor is at rest, the extended curved flange 63 of the valve 60 rests against the governor 61 at a point near its fulcrum. It will also be noted that the governor arms 62 are curved so that a definite cam action results. Initial movements of the governor may be contrasted to its subsequent movements for when the outer tip of the governor arms 62 engage the curved portion of the flange 63, a more rapid movement results to balance the increased centrifugal force by lengthening the distance from the governor fulcrum to the point where the arm 62 contacts the valve flange 63. While a uniformly curved outer end of the valve flange is shown for reasons of simplicity with corresponding shaped governor arms, these surfaces may be irregular to maintain operating conditions as required.

The valve 60 is under the influence of a spring 64 the resistance of which is adapted to be increased by a ring 65 slidably mounted on the hub 66 overlying the driven shaft 5 within the casing 1. Suitable thrust bearing 67 separate the enlarged portion 40 of the shaft 5 from the hub 66 while the thrust bearings 68 separate the spring 58 and the ring 65.

It will be understood that the spring 58 could be provided with a non-slidable anchor but the arrangement permits the resistance of the spring to be varied to affect the action of the governor 61 as will subsequently be more fully described.

The ring 65 is under the control of a fork 69 carried by the shaft 70 which is in turn rotated by the lever 71 to which is pivotally secured a lever 72 adapted to be actuated by the lever 73 under the control of the operator as suggested by the brake 74 and accelerator 75. The lever 73 is pivoted as at P so that on movement of the accelerator 75 or brake 74, the lever 72 is thrust to the right as viewed in Fig. 1 with the result that the ring 65 will be thrust to the left.

The operation of that part of my device thus far described may at this time be conveniently described. Assuming the main clutch to be engaged and the valve 51 open to permit fluid under pressure to flow through the device to the valve 60 the various gear ratio changes take place as follows.

When the vehicle is initially moving the resistance of the shaft 5 is very great and as a result the gear 10 and the case 11 develop a rotation counter to that of the drive shaft 3. Through the one way clutch 19 the rim gear 15 is carried therewith. The gear 20 is accordingly rotated in the same direction as the drive shaft 3 and in fact locked thereto reducing the rotation of the housing 11 and causing a low speed forward drive as has been before described.

As the speed of the vehicle increases the governors 61 will be effective to carry the valves 60 against the spring 58 which will offer a great resistance if the operator is desiring sudden acceleration or deceleration. Assuming that the force of the governor 61 is sufficient to move the valve 60, the valve 60 will assume a position in which the port 56 and the conduit 57 are connected. In this position it will be noted that detents 76 tend to hold the governor in that position until the speed thereof has materially increased. Fluid under pressure is now admitted directly against the piston 42 tending to move it forwardly.

Through the hub 43 the gear casing 11 is similarly carried and with it the rim gear 15 until the clutch members 22 and 23 are interengaged.

In this position, rotation of the rim gear 15 and the casing 11 counter to that of the drive shaft 3 is prevented and the gear connection 8, 10 and 9 will operate to effect a speed suitable for second speed.

Further increase in speed of the governor will overcome the resistance of the detents 76 and will tend to slide the valve 60 further until the conduit 58 is also connected to the port 56 and fluid is free to enter between the pistons 42 and 45. When the pressure therein is effective to overcome the spring 46 the piston 45 moves carrying the clutch members 47 and 48 into engagement locking the casing 11 to the cylinder 41 to effect a suitable high speed.

It will be noted that because of the nature of the clutches 22 and 23 and 47 and 48 it is desirable to effect a positive disengagement thereof such as is provided by the spring 47 and for that reason I use the gears 8 and 10 as spiral gears so that a slight rearward thrust tendency of the casing 11 is created which through the overhang 77 is adapted to contact on rearward movement, the flange 78 on the hub of the ring gear 15 (see Figs. 1 and 4).

Similarly because of the nature of these clutches I have found it necessary for efficient operation to use the form of clutch shown in Figs. 5 and 6. This clutch might be conveniently housed in a casing 101 which is provided with axial ports 102 and 103 for the driving portion 104 and for the driven portion 3 of the shaft respectively. Suitable bushings indicated as at 105 are, of course, provided. The driving portion 104 includes a hollow enlarged head 106 adapted to receive the flanged head 107 of the slidable clutch actuating member 108. The head 106 is provided with a flanged end provided with a plurality of bores as at 109 to receive pairs of ball bearings 110, suitable antifriction devices 111 which are separated by the spring 112. Forwardly of the flange of the head 106 the governors 113 are positioned. These include arms 114 which extend through the apertures 115 in the head 106 into an annular groove 116 in the flange 107. Rearwardly of the flange 107 the member 108 is provided with a sloped shoulder 117. The shaft 3 is provided with a hollow cylindrical head 118 overlying the flange 106 carried by the driving portion 104. The inner surface of the cylinder 118 is provided, as is shown most clearly in Fig. 6, with a series of detent surfaces 119 into which the spring 112 force the ball bearings 110 to effect engagement.

The casing 101 is formed with an opening 120 and as indicative or suggestive of one possible basis of control, I have shown a lever 121 pivoted as at 121ª in control of a recessed slide 122 effective to hold before the motor is started, the governor 112 in inactive position thereby permitting the clutch provided between the driving and the driven members to slip.

Assuming the clutch mechanism just described to be disengaged so that the governor 113 may be carried outwardly by centrifugal force, it will be seen that as the speed of the drive shaft increases the flanged head 107 is drawn forward carrying the shoulder 116 forwardly to compress the spring 110 to establish a more positive interlock between the driving portion 104 and the cylinder 118 so that I may cushion any shock from the engagement of positive clutching means such as those that I have used for illustrative purposes.

In Figs. 8 to 11, I have shown novel means by which the valve movements may be dominated without pressure against the actuating operator controlled mechanisms (shown for purposes of illustration as the brake 74 and the accelerator 75).

In this modification, the governors 124 are pivoted to lie parallel to the head of the cylinder 41. A sleeve 124 surrounding the shaft portion 40 includes a gear portion 125ª in mesh with which are the toothed portion 124ª of the governors 124.

The sleeve 125 is recessed to receive balls 126 which are mounted therein and in the grooves 126ª in the slide valve 60ª which through a connection indicated at 127 is free to rotate though slidably under the influence of the lever arm 70.

It will be noted that the valve 60ª includes two oppositely disposed raised portions 128 and 129. As will be apparent from Figure 9, the action of the governors 124 on the sleeve 125 as they are effected by centrifugal force rotate the valve 60ª in a direction counter to that of the driven shaft, the raised portions 128 and 129 are formed to present a forwardly extended tapering surface (see Figs. 8 and 10). I have shown the conduits leading to the cylinder 41 as at 57 and 58.

In operation, the action of the governors 124 are effective to rotate the valve 60ª slowly to cover the ports 57 and 58, successively. Actuation of the operator controlled machine is effective to slide this valve 60ª forwardly so that the connection of the ports 57 and 58 will be delayed to permit gear ratio changes to be effected and desired by the operating conditions sought.

The governors 124 are inter-connected by a spring 130 which is so formed that each side thereof is balanced although one side 131 includes an extra turn. The spring on the side 131 is thinner (for example) to permit the spring to be properly balanced.

The varied uses to which speed devices may be put suggest a different basis of control as may be best illustrated by its use in association with a compressor wherein it is desired to regulate the speed of the compressor with relation to a desired maximum pressure in a supply tank.

My invention is particularly adapted for such purposes as will be apparent from Fig. 7.

The lever 71 permitting in Figs. 1 and 8 the dominance of the governor by the operator may, as in Fig. 7, be controlled by fluid or other pressures through conduit 140 from the pressure discharge of compressor, pump, or other equipment. From this source a line 140 discharges into a cylinder 141 to actuate a piston 142 against the influence of a spring 143 the tension of which may be adjusted by the plug 143ª. The connecting rod 144 of the piston 142 is pivotally connected to the lever 71 and extends into a recess 145 of a rod 146 to establish after predetermined movements of the piston a connection of the extension rod 146 and the piston rod 144. This extension rod 146 is pivotally connected to a lever 147 controlling the throttle valve indicated at T.

I have indicated at 148 a stop towards which the lever 147 is drawn by the spring 148ª when not under the control of the piston 142. This stop may be adjusted to permit the throttle to be controlled as desired.

Assuming the source of pressure to be great the load on the compressor will, of course, be materially increased and as the pressure increases the spring 143 in the cylinder is overcome and the piston 142 is partially expelled causing the actuation of the lever 71 to affect the action of the governors 61 or 124. This would be effective to increase the ratio between the drive shaft 3 and the driven shaft 5 so that the engine would be better able to take care of the increased load caused by the high pressure.

Further increase in pressure will not only cause increase in resistance to the gear ratio changes but will also result in the decreased flow of gas to the engine. Similarly, it will be obvious as the pressure decreases the engine will be regulated to take care of its correspondingly lighter load. Throttles such as indicated at T include means to adjust them to establish the desired idling condition so that the engine will not stall. In accordance with my invention, the throttle T is not affected until the lowest gear ratio is established between the shafts.

In Fig. 3 I have shown an effective reversing mechanism that is in keeping with the general simplicity of my invention and that may be used in a system including a device to cushion the shock of engagement of such clutch as there shown.

A casing 150 may conveniently be secured to the rear of the casing 1. Within this casing the driven shaft 5 is divided into a driving portion 5 and a driven portion 151 adapted to be connected through the medium of gears 152 and 153 both meshing with a pinion gear 154 pivotally mounted in a freely rotatable casing 155. Bushings are indicated at 155a. The gear 153 is provided with suitable clutch surface such as the indentations 156 into which the teeth 157 of a sleeve member 158 are adapted to interlock. The sleeve member 158 is adapted to engage by a similar clutching means the hub member 159 surrounding the driven shaft 151.

This sleeve 158 is splined as indicated at 158a to the housing 155 and may be moved by means of the fork 160 mounted on a shaft 161 which may be turned by any actuating means (not shown). When the lever 160 is moved to carry the sleeve into a position effective to interlock the clutch surfaces 156 and 157, the housing 155 rotates with the driven shaft 151 as in forward speed while if the fork or lever 160 is moved in the opposite direction until the other clutch interlocks the sleeve 158 and the hub member 159 a reverse rotation of the driven shaft 151 results. This simple mechanism makes possible a very effective reversing mechanism.

The casings 101 and 150 may be integral with the casing 1 and as fluid must be returned to the source (not shown) suitable outlet or connecting ports P are shown.

If desired, and if the source of power is adequate, the valves 60 or 60a may be normally positioned to connect the conduits 56 and 57 so that the load will be assumed at second speed unless the torque is too great. If the torque is too great, further movement of the accelerator positions the valve to close the conduit 57 thus establishing the low speed ratio. With the valve positioned as indicated the accelerator may be termed the dominant factor.

It will be seen that my present invention is well adapted to solve problems presented by a variety of operation conditions.

What I therefore claim and desire to secure by Letters Patent is:

1. In a change speed device, a drive shaft, a driven shaft, an idler assembly connecting said shafts and including portions slidable and independently rotatable with reference to said shafts, means adapted to control said portions to effect desired ratios between said shafts, said means including a stationary clutch element to prevent rotation of said portions counter to said drive shaft and a clutch adapted to connect said portions with said driven shaft, a pair of pistons concentrically mounted on said driven shaft, a source of fluid under pressure communicating through said drive shaft with said pistons, a valve in control of said fluid under pressure, a governor adapted to operate said valve and operator controlled means adapted to affect said governor action as desired.

2. In a change speed device, a drive shaft, a driven shaft, an idler assembly connecting said shafts and including portions slidable and independently rotatable with reference to said shafts, means adapted to control said portions to effect desired ratios between said shafts, said means including a stationary clutch element to prevent rotation of said portions counter to said drive shaft and a clutch including a member slidably splined to said driven shaft and adapted to connect said portions therewith, fluid pressure operated means adapted to carry said portions into contact with said stationary clutch element and said second-mentioned clutch into engagement with said portions, and a control for said pressure means dependent on driven shaft speeds and on operating conditions desired.

3. In a change speed device, a drive shaft, a driven shaft, an idler assembly connecting said shafts and including portions slidable and independently rotatable with reference to said shafts, means adapted to control said portions to effect desired ratio changes, said means comprising a stationary clutch element adapted to prevent rotation of said portions counter to said drive shaft, a cylinder on said driven shaft, a piston in said cylinder including a hub adapted to move said portions into contact with said stationary clutch element, a second piston slidably mounted on said hub and splined in said cylinder, said second named piston and said portions including clutch surfaces to cause on interengagement the rotation of said portions with said driven shaft, fluid pressure delivery means to each piston, said fluid delivery means including controls predicated on driven shaft speed and desired operating conditions.

4. In a change speed device, a drive shaft, a driven shaft, means adapted to connect said shafts at different ratios, a pair of fluid pressure operated pistons adapted to cooperate with said means to effect desired ratio changes, a fluid conduit through said drive shaft and said driven shaft to the surface thereof, a conduit to each of said pistons including portions extending from said driven shaft surface through said driven shaft, a slide valve adapted to connect said conduit with said delivery conduit, a governor to operate said valve, and pressure controlled means to affect said governor action as desired.

5. In a change speed device, a drive shaft, a driven shaft, means adapted to connect said shafts at different ratios, a pair of fluid pressure operated pistons adapted to cooperate with said means to effect different ratios between said shafts, a source of fluid under pressure communicating with the surface of said driven shaft, a conduit to each of said pistons through said driven shaft from the surface thereof, a slide valve adapted to effect communication between said pressure source and said conduits, a governor responsive to the speed of the driven shaft to operate said valve, and means to vary the operation of said governor as required.

6. In a change speed device, a drive shaft, a driven shaft, means adapted to connect said shafts at different ratios, a pair of fluid pressure operated pistons adapted to cooperate with said means to effect different ratios between said shafts, a source of fluid under pressure communicating with the surface of said driven shaft, a conduit to each of said pistons through said driven shaft from the surface thereof, a slide valve adapted to effect communication between said pressure source and said conduits, a governor responsive to the speed of the driven shaft to operate said valve, and means to vary the operation of said valve as required, said second named means comprising a member adapted to slide said valve against the action of said governor, a source of fluid under pressure responsive to the driven shaft torque, a cylinder, a conduit from said source to said cylinder, a piston in said cylinder, a spring adapted to be compressed by said piston as said piston is actuated by said pressure, said piston being in control of said member.

7. In a change speed device, a drive shaft, a driven shaft, means adapted to connect said shafts at different ratios, a pair of fluid pressure operated pistons adapted to cooperate with said means to effect different ratios between said shafts, a source of fluid under pressure communicating with the surface of said driven shaft, a conduit to each piston, a valve slidably mounted on said driven shaft, said valve being adapted to effect communication between said source and said conduits, a governor responsive to the speed of the driven shaft to operate said valve, and means to vary the operation of said governor as required, said second named means comprising a member adapted to slide said valve against the action of said governor, a source of fluid under pressure responsive to the driven shaft torque, a cylinder, a conduit from said source to said cylinder, a piston in said cylinder, a spring adapted to be compressed by said piston as said piston is actuated by said pressure, means to vary the tension of said spring and said piston being in control of said member.

8. In a change speed device, a drive shaft, a driven shaft, means adapted to connect said shafts at different ratios, a pair of fluid pressure operated pistons adapted to cooperate with said means to effect different ratios between said shafts, a source of fluid under pressure communicating with the surface of said driven shaft, a conduit to each piston, a valve slidably mounted on said driven shaft, said valve being adapted to effect communication between said source and said conduits, a governor responsive to the speed of the driven shaft to operate said valve, and means to vary the operation of said governor as required, said second named means comprising a member adapted to slide said valve against the action of said governor, a source of fluid under pressure responsive to the driven shaft torque, a cylinder, a conduit from said source to said cylinder, a piston in said cylinder, a spring adapted to be compressed by said piston as said piston is actuated by the last mentioned fluid under said pressure, said piston being in control of said member, a valve in control of a fuel line and being under the control of said piston.

9. In a change speed device, a drive shaft, a driven shaft, means adapted to connect said shafts at different ratios, a pair of fluid pressure operated pistons adapted to cooperate with said means to effect different ratios between said shafts, a source of fluid under pressure communicating with the surface of said driven shaft, a conduit to each piston, a valve slidably mounted on said driven shaft, said valve being adapted to effect communication between said source and said conduits, a governor responsive to the speed of the driven shaft to operate said valve, and means to vary the operation of said governor as required, said second named means comprising a member adapted to slide said valve against the action of said governor, a source of fluid under pressure responsive to the driven shaft torque, a cylinder, a conduit from said source to said cylinder, a piston in said cylinder, a spring adapted to be compressed by said piston as said piston is actuated by the said last mentioned fluid under pressure, said piston being in control of said member, a valve in control of a fuel line, means in control of said valve, said means being adapted to be actuated on predetermined movement of said piston.

10. In a change speed device, a drive shaft, a driven shaft, means adapted to connect said shafts at different ratios, a pair of fluid pressure operated pistons adapted to cooperate with said means to effect different ratios between said shafts, a source of fluid under pressure communicating with the surface of said driven shaft, a conduit to each piston, a valve slidably and rotatably mounted on said driven shaft, said valve being formed to cover said conduits successively on partial rotation including a diagonally disposed edge whereby the extent of rotation of said valve necessary to effect communication between said conduits is dependent on the axial position of said valve relative to said conduits, a sleeve, said sleeve and said valve having a slidably splined connection, governors responsive to the speed of said driven shaft, said governors and said sleeve having interengaging gear portions, a lever, said lever and said valve including a connection permitting free rotation of said valve, said lever being adapted to be actuated to slide said valve to vary the extent of the rotation of said valve necessary to effect communication between said conduits.

11. In a change speed device, a drive shaft, a driven shaft, means adapted to connect said shafts at different ratios, a pair of fluid pressure operated pistons adapted to cooperate with said means to effect different ratios between said shafts, a source of fluid under pressure communicating with the surface of said driven shaft, a conduit communicating with each piston, a valve slidably mounted on said driven shaft, said valve being adapted to effect communication between said source and said conduits, a governor responsive to the speed of the driven shaft to operate said valve and operator controlled means to vary the operation of said governor as required by operating conditions.

12. In a change speed device, a drive shaft, a driven shaft, an idler assembly connecting said shafts and including portions independently rotatable with reference to said shafts, means to limit and means to prevent retrograde rotation of said assembly, and means to rotate said assembly with said driven shaft, fluid pressure operated means to operate said second and third named means, and means in control of said fluid pressure operated means, said means comprising a valve, a governor to actuate said valve, and operator controlled means including a resilient member to dominate the action of said governor members.

13. In a change speed device, a drive shaft, a driven shaft, means adapted to connect said shafts at different ratios, said means including a slidable member mounted on said driven shaft for independent rotation, a cylinder carried by said driven shaft, a piston in said cylinder, said piston including a hub in contact with said slidable member, a second piston slidably mounted on said hub and splined in said cylinder, clutch elements carried by said second piston and said slidable member, a source of fluid in communication with said pistons, a valve in control of said fluid, and means responsive to the speed of said driven shaft to actuate said valve, and a compressible member to oppose the action of said speed responsive means.

14. In a change speed device, a drive shaft, a driven shaft, means adapted to connect said shafts at different ratios, said means including a slidable member mounted on said driven shaft for independent rotation, a cylinder carried by said driven shaft, a piston in said cylinder, said piston including a hub in contact with said slidable member, a second piston slidably mounted on said hub and splined in said cylinder, clutch elements carried by said second piston and said slidable member, a source of fluid in communication with said pistons, a valve in control of said fluid, means responsive to the speed of said driven shaft to actuate said valve, a compressible member to oppose the action of said speed responsive means, and detent means to delay the action of said speed responsive means.

15. In a change speed device, a drive shaft, a driven shaft, an idler assembly adapted to connect said shafts and being slidable and adapted to be independently rotatable with reference to said shafts, said assembly including a gear on each of said shafts, and an idler gear in mesh with each of said shaft gears, means to hold said assembly against rotation, said means including a pair of jaw toothed clutch elements, one of said clutch elements being slidable, means to slide said assembly and said slidable clutch element to effect a clutch engagement, and means to disengage said clutch elements, said last mentioned means comprising a member carried by said slidable clutch element and a member adapted to engage said first named member on rearward movement of said assembly, and at least two of the meshed gears of said assembly having their teeth disposed to urge said assembly rearwardly.

16. In a change speed device, a drive shaft, a driven shaft, an idler assembly adapted to connect said shafts and to rotate independently thereof, means to limit retrograde rotation of said assembly beyond a predetermined ratio relative to said drive shaft to establish a low driven shaft speed, means to hold said assembly against rotation to establish an intermediate driven shaft speed, means to rotate said assembly with said driven shaft to establish a high driven shaft speed, fluid pressure operated means to actuate said second and third-named means in predetermined order.

17. In a change speed device, a drive shaft, a driven shaft, an idler assembly adapted to connect said shafts and to rotate independently thereof, means to limit retrograde rotation of said assembly beyond a predetermined ratio relative to said drive shaft to establish a low driven shaft speed, means to hold said assembly against rotation to establish an intermediate driven shaft speed, means to rotate said assembly with said driven shaft to establish a high driven shaft speed, each of said second and third-named means including slidable interengageable members and a fluid operated piston to effect engagement of said members in each of said second and said third-named means, a source of fluid under pressure to each of said pistons, a valve in control of said source, and means responsive to the speed of said driven shaft to actuate said valve.

18. In a change speed device for a prime mover having an operator control, a pair of clutches, a piston to actuate each of said clutches, a source of fluid pressure in communication with each of said pistons, a valve to effect communication between said source and said pistons comprising a member having an inlet port and a pair of outlet ports and a member slidable and rotatable with reference to said first-named member to connect said ports in predetermined order, speed responsive means to rotate said second-named member and including a slidable interconnection therewith, and means moveable with said control to slide said member, the extent of the rotation of said second-named member to connect said ports being determined by the position of said second-named member effected by said last-named means.

19. In a change speed device, a drive shaft, a driven shaft, means to connect said shafts at different ratios, hydraulically operated means to effect establishment of said different ratios, a valve in control of said hydraulically operated means, speed responsive means to actuate said valve and means to vary the operation of said valve as required, said last named means comprising a member to actuate said valve against the action of said governor, a source of pressure responsive to the driven shaft torque, a cylinder, a conduit from said source to said cylinder, and a piston in said cylinder to actuate said member and a spring adapted to be compressed by said piston.

JESSE W. HALE.